US007332065B2

(12) United States Patent  (10) Patent No.: US 7,332,065 B2
Shimamune  (45) Date of Patent: Feb. 19, 2008

(54) ELECTRODE

(75) Inventor: Takayuki Shimamune, Tokyo (JP)

(73) Assignee: Akzo Nobel N.V., Arnhem (NL)

( * ) Notice: Subject to any disclaimer, the term of this patent is extended or adjusted under 35 U.S.C. 154(b) by 356 days.

(21) Appl. No.: 10/865,786

(22) Filed: Jun. 14, 2004

(65) Prior Publication Data

US 2005/0014066 A1 Jan. 20, 2005

Related U.S. Application Data

(60) Provisional application No. 60/479,441, filed on Jun. 19, 2003.

(51) Int. Cl.
 *C25B 11/04* (2006.01)
(52) U.S. Cl. .......................... 204/290.13; 204/290.12; 204/290.01; 204/290.15; 204/291; 204/294; 427/58; 427/77; 427/180; 427/190
(58) Field of Classification Search ........... 204/290.01, 204/290.03, 290.08, 290.09, 290.12, 290.13, 204/290.14, 290.15, 291, 294, 292
See application file for complete search history.

(56) References Cited

U.S. PATENT DOCUMENTS 3,711,382 A    1/1973  Anthony
4,039,400 A *  8/1977  Hayfield ............... 205/171
4,086,157 A    4/1978  Koziol
4,392,927 A    7/1983  Fabian
4,568,568 A    2/1986  Asano
5,900,127 A    5/1999  Iida
6,071,570 A *  6/2000  Hardee et al. ............ 205/67
6,315,886 B1 * 11/2001 Zappi et al. ............ 205/701
2002/0134674 A1* 9/2002  Andrews et al. ......... 204/242

* cited by examiner

*Primary Examiner*—Bruce F. Bell
(74) *Attorney, Agent, or Firm*—David J. Serbin; Robert C. Morriss

(57) ABSTRACT

The present invention relates to a process for manufacturing an electrode comprising depositing on an electrode substrate a binder dispersion comprising a precursor of a conductive or semiconductive oxide, forming a conductive or semiconductive oxide coating from the precursor on the electrode substrate, depositing an electroconductive titanium oxide and electrode particles on the conductive or semiconductive oxide coating, adhering the electroconductive titanium oxide and the electrode particles to the formed conductive or semiconductive oxide coating. The invention also relates to an electrode obtainable by the process, and the use thereof in an electrolytic cell.

18 Claims, No Drawings

ELECTRODE

CROSS-REFERENCE TO RELATED APPLICATIONS

This application claims priority from provisional application 60/479,441 filed Jun. 19, 2003.

The present invention relates to an electrode, a process of manufacturing the electrode, and the use thereof.

BACKGROUND OF THE INVENTION

Electrodes for use in industrial electrolysis, water electrolysis, and other electrolytic processes such as a platinum group metal oxide coated electrode usually have a low electric resistance at high currents. However, such electrodes usually have a short durability.

U.S. Pat. No. 4,568,568 discloses a method of plasma spray coating particles on an electrode substrate involving heating the particles at temperatures up to 6000° C., which then collide with the substrate at a high speed, whereby the particles partially melt and produce a layer of even thickness on the substrate. The particles do not impart an increased surface area to the obtained electrode.

The present invention intends to solve the drawbacks of the prior art and to provide a particle coated electrode having increased specific surface area, stability and performance, which finds a great number of applications. The invention also intends to provide a convenient and reliable process of adhering particles to an electrode in a cost-effective way. A further intention of the invention is to provide a process which enables adhering particles to an electrode without deforming the shape of the particles.

THE INVENTION

The present invention relates to a process for manufacturing an electrode comprising depositing on an electrode substrate a binder dispersion comprising a precursor of a conductive or semiconductive oxide, forming a conductive or semiconductive oxide coating from the precursor on the electrode substrate, depositing an electroconductive titanium oxide and electrode particles on the conductive or semiconductive oxide coating, adhering the electroconductive titanium oxide and the electrode particles to the formed conductive or semiconductive oxide coating.

By the term "dispersion" as used herein is comprised besides ordinary dispersions, suspensions and slurries of particles, also solutions of e.g. oxide forming precursors.

According to one embodiment, the conductive or semiconductive oxide is adhered by decomposing the precursor, preferably by thermally decomposing it. However, the precursor can also be precipitated resulting in the formation of an oxide from the original precursor which may be e.g. a hydroxide or hydrated oxide of titanium or other suitable metal.

The material of the electrode substrate may be of any conductive element which can retain its physical integrity during the manufacturing and its subsequent use in e.g. an electrolytic cell and which preferably can resist alkaline and acidic electrolytes. Suitable electrode substrate materials include electrically conductive metals such as copper, nickel, valve metals such as titanium, tantalum, zirconium or niobium, and alloys or mixtures thereof, preferably titanium or alloys thereof.

The configuration of the electrode substrate used is not critical. A suitable electrode substrate may, for example, take the form of a flat sheet or plate, a curved surface, a convoluted surface, a punched plate, a woven wire screen, an expanded mesh sheet, a rod, or a tube. However, the electrode substrate preferably has a planar shape, most preferably in the form of a sheet, mesh or plate.

The electrode substrate can be roughened by means of sand blasting, grit blasting, chemical etching and the like. The use of chemical etchants is well known and such etchants include most strong inorganic acids, such as hydrochloric acid, sulphuric acid, nitric acid and phosphoric acid, but also organic acids such as oxalic acid.

The precursor of the conducting or semiconducting oxide, which can be in the form of a dissolved salt or acid, can be dissolved in an acidic aqueous or organic dispersion or mixtures thereof. Preferred organic dispersions include alcohols such as iso-propanol, n-propanol, or butanol, or mixtures thereof. Organic salts or acids are preferably dissolved in an organic solvent, most preferably in an alcohol as described herein, whereas inorganic salts and acids preferably are dissolved in a substantially aqueous dispersion.

Preferably, the organic and/or aqueous binder dispersions have a pH from about 0.5 to about 4, most preferably from about 0.5 to about 2. Preferably, the binder dispersion has a metal concentration from about 10 to about 200, most preferably from about 20 to about 30 g metal/l.

The precursor may be any suitable organic and/or inorganic salt or acid. Preferably, the precursor is a mixture of at least two organic and/or inorganic salts or acids of titanium, tantalum, tin, antimony, indium and tin salts, preferably of titanium and tantalum. Preferably, butyl or ethyl titanate and butyl or ethyl tantalite are employed in combination. According to one embodiment, butyl titanate and butyl tantalite are employed in combination. The molar ratio of titanium to tantalum suitably is from about 9:1 to about 7:3, preferably from about 9:1 to about 8:2. Precursors of organic salts and/or acids are preferred, since their corresponding conductive or semiconductive oxides can be formed at a lower temperature. This is preferred because a low heating temperature renders the electroconductive titanium oxide particles less oxidised resulting in higher electroconductivity.

According to one embodiment, electroconductive titanium oxide is suspended in the binder dispersion. As a result, a conductive or semiconductive oxide coating binding an evenly dispersed electroconductive titanium oxide will be formed on the electrode substrate. This may be advantageous to better adhere subsequently deposited electrode particles, because the electroconductive titanium oxide particles, which preferably are smaller than the electrode particles, surround the electrode particles and thus impart better adhesion between the electrode substrate, the electroconductive titanium oxide particles and the electrode particles, due to an increased contact area.

According to one embodiment, the precursor is thermally decomposed at a temperature from about 300 to about 600, more preferably from about 450 to about 500° C. However, if the precursor is a colloidal solution, e.g. a slightly alkaline alcohol solution of alcoxy-titanium and tantalum in ammonia, the decomposition can be carried out at a temperature from about 300 to about 450° C. This lower temperature is possible probably due to the fact that colloidal solutions such as colloidal hydroxide or hydrated oxides solutions can be transformed to oxides by means of dehydration.

According to one embodiment, electroconductive titanium oxide and electrode particles suspended in an aqueous or organic dispersion, preferably an aqueous dispersion, are deposited on the formed conductive or semiconductive oxide coating.

According to one embodiment, electroconductive titanium oxide and electrode particles are suspended in the binder dispersion resulting in adhesion of electrode particles to the oxide coating formed from the precursor.

In order to get a thicker conductive or semiconductive oxide coating, the deposition procedure can be repeated, preferably at least 2 times, most preferably at least 4 times. Preferably, the thickness of the oxide is from about 2 to about 4 µm.

According to one embodiment, the electroconductive titanium oxide has a particle size from about 0.1 to about 100, more preferably from about 1 to about 20, even more preferably from about 5 to about 20 µm, and most preferably from about 5 to about 10 µm.

The electroconductive titanium oxide preferably is substantially in magneli phase (including various oxides such as $Ti_4O_7$ and $Ti_5O_9$) and/or TiO depending on where the electrode to be manufactured will be used.

Magneli phase titanium oxide is preferably used for manufacturing electrodes for use in strongly acidic electrolytes such as sulphuric or nitric acid, due to its capability of resisting corrosive environments. TiO is preferably used in electrodes for use in electrolytes with a pH above about 1.5.

Electroconductive titanium oxide can be prepared from conventional sintering mixtures of nonconductive titanium oxide ($TiO_2$) in commercially available rutile or anatase phase and titanium metal at a temperature of 1000 to 1500° C. in vacuum.

Electroconductive titanium oxide may also be prepared by mixing pulverised $TiO_2$ in rutile phase and agate mortar followed by sintering. The obtained electroconductive titanium oxide powder contains a mixture of $Ti_3O_5$, $Ti_4O_7$ and/or $Ti_5O_9$.

The term "electrode particles" as used herein means are electroconductive and have a catalytic activity. The material may be diamond, e.g. boron doped diamond, titanium oxide such as titanium oxide in magneli phase (Ebonex™), tin dioxide, magnetite ($Fe_3O_4$), Ni-ferrite, β-lead dioxide (β-$PbO_2$), BN, WC, SiC, and/or mixtures thereof, preferably diamond. Suitably, the electrode particles have a size from about 0.5 to about 100, preferably from about 1 to about 20, and most preferably from about 5 to about 10 µm.

Diamond particles may be obtained from conventional diamond synthetic processes at high temperature and high pressure.

According to one preferred embodiment, two different layers are applied on the conductive or semiconductive oxide coating to provide an under layer suitably comprising electroconductive titanium oxide and a top layer of electrode particles to increase the stability of the electrode and more firmly adhere the electrode particles.

According to a preferred embodiment, a roughened, blasted and pickled electrode substrate is painted with a binder dispersion comprising a precursor of a semiconducting oxide of a titanium oxide which is subsequently decomposed at a temperature of from about 500 to about 600° C. to form a conductive oxide before depositing a slurry of electroconductive titanium oxide having a titanium content of about 3 to about 20 times of the metal content of the binder dispersion followed by thermal treatment at 400 to 500° C. for 10 min. Subsequently, in a second step, a dispersion comprising about 50 wt % electrode particles and about 50 wt % electroconductive titanium oxide is deposited on the oxide coating and thermally treated to adhere the electroconductive titanium oxide and the electrode particles to the formed titanium oxide coating. According to one embodiment, the second step is repeated at least 2 times, preferably at least 3 times.

The obtained electrode can be further stabilised in vacuum or inert atmosphere, e.g. in argon gas at a temperature from about 500 to about 600° C.

The invention further relates to an electrode obtainable from the process as described herein.

The invention further relates to an electrode comprising an electrode substrate, a conductive or semiconductive oxide adhered to the electrode substrate, and electrode particles and electroconductive titanium oxide adhered to the conductive or semiconductive oxide coating. The electrode substrate, the conductive or semiconductive oxide, the electroconductive titanium oxide, and the electrode particles preferably are as described herein.

According to one embodiment of the invention, the conductive or semiconductive oxide may contain several oxide layers, preferably two oxide layers.

According to one embodiment, a first layer of oxide coating comprises electroconductive titanium oxide and electrode particles. The oxide coating of the first layer may contain from about 10 to about 70, preferably from about 40 to about 60 wt % electrode particles. The first layer may contain from about 20 to about 80, preferably from about 30 to about 60 wt % electroconductive titanium oxide. Preferably, a second layer suitably comprises from about 30 to about 80, preferably from about 50 to about 70 w % electrode particles. Preferably, the remaining part of the second layer is covered with electroconductive titanium oxide. According to one embodiment, the content of electroconductive titanium oxide is from about 20 to about 70, preferably from about 30 to about 50 wt % based on the weight of the oxide coating. Preferably, the deposition of electrode particles is from about 10 to about 500, more preferably from about 50 to about 100 g/m² electrode substrate area. Preferably, the deposition of electroconductive titanium oxide is from about 5 to about 200, more preferably from about 10 to about 100 g/m² electrode substrate area.

It has been found that the obtained electrodes can remain stable even in corrosive atmosphere under high potentials of more than 2V vs NHE and high currents. This may be due to the fact that the oxide formed from the binder dispersion adheres particles of electroconductive titanium oxide, which in turn, possibly in combination with the oxide coating formed from the binder solution, adhere the electrode particles.

According to one embodiment, the electrode has a second layer comprising electroconductive electrode particles of diamond, tin dioxide, magnetite ($Fe_3O_4$), nickel ferrite, β-lead dioxide, titanium oxide, BN, WC, SiC, $Si_3N_4$ or mixtures thereof, preferably of titanium oxide and/or diamond, and most preferably diamond.

The electrode can take any shape. However, a planar electrode will be preferred for most applications. Preferably, the electrode does not comprise bi-metal spinel in any of its layers. Preferably, the electrode does not comprise any platinum group metals or oxides thereof since this may lead to passivity problems.

The invention also relates to the use of an electrode in an electrolytic cell, for electrolytic processes in water treatment, secondary battery, such as in redox flow cells, and electrolytic ozone generation.

Particularly, electrodes provided with electrode particles of boron doped diamond can be used as anodes for generation of oxygen, ozone, hydrogen peroxide, hydroxyl radicals; in water electrolysis, water treatment, and electroorganic synthesis due to its good electric conductivity as p-type semiconductor. As a cathode, the electrode is preferably used for electroorganic synthesis, formation of OH radicals, various oxidation processes, redox flow battery for power storage, and normalization of power consumption.

The invention being thus described, it will be obvious that the same may be varied in many ways. Such variations are not to be regarded as a departure from the gist and scope of the present invention, and all such modifications as would be obvious to one skilled in the art are intended to be included within the scope of the claims. The following examples will further illustrate how the described invention may be performed without limiting the scope of it.

EXAMPLE 1

A titanium plate with a thickness of 1 mm was grit-blasted to a surface roughness of $R_a=5$ µm, and pickled with sulphuric acid in order to prepare an electrode substrate. A binder solution comprising $TiCl_4$ and $TaCl_5$, dissolved in a 10 wt % HCl solution, was applied on the electrode substrate and heated at 540° C. for 10 min. The coating and heating steps were repeated 4 times resulting in an oxide film of 0.2 µm on the electrode substrate of tantalum and titanium oxides in a molar ratio of Ta to Ti of 1 to 9. A slurry was prepared by suspending an electroconductive titanium oxide powder in a HCl solution of penta-butyl tantalite and tetra-butyl titanate with a molar ratio of Ti to Ta of 8 to 2. The weight ratio of electroconductive titanium oxide to the total Ti and Ta metal content in the binder dispersion was 20:1. The dispersion was stirred and painted on the oxide film. After drying, the electrode was first heated at 60° C. for 10 min, then heated at 450° C. for 10 min. A porous oxide coating of 60 g/m² was obtained having a specific surface area of 10 m²/m² projected substrate area. On the porous oxide coating a slurry prepared from 50 wt % electroconductive titanium oxide and 50 wt % boron doped electroconductive diamond powder with an average particle size of 7 to 10 µm was applied. The slurry was subsequently dried and heated at 450° C. for 10 min. The deposition of the slurry was repeated once followed by the same heat treatment. The obtained electrode showed to work well in a continuous electrolysis process at a current density of 1 A/dm².

EXAMPLE 2

An electrode was prepared by depositing electroconductive titanium oxide on the titanium electrode substrate prepared in the same way as in example 1. An electroconductive titanium oxide powder was suspended in a binder dispersion containing titanium trichloride and penta-butyl tantalite having a molar ratio of titanium to tantalum of 9 to 1. The weight ratio of electroconductive titanium oxide to the total Ti and Ta metal content in the binder dispersion was 20 to 1. The binder dispersion was applied on the electrode substrate which was subsequently dried in air at room temperature followed by drying at 60° C. and heat treatment at 500° C. The application of the binder solution was repeated three times. An electroconductive titanium oxide layer (substantially as $Ti_4O_7$) was formed under the same conditions as in example 1, in which the coating amount was 60 g/m² substrate area. Then, an electroconductive titanium oxide layer was formed from magneli phase titanium oxide particles having a size of 5 to 10 µm, which were suspended in a slurry, and then coated and heat treated at 450° C. for 10 minutes as in example 1. This procedure was repeated three times resulting in a total deposition of 50 g titanium metal/m² substrate area. The electric conductivity of the electrode was somewhat higher than the electrode of example 1 due to the electrode materials. The active surface area was increased to 20 m²/m² electrode substrate area. Then, continuous electrolysis was performed at a current density of 2 A/dm².

EXAMPLE 3

An electrode according to example 2 was prepared, except for the electrode particles which were of tin oxide and antimony oxide in rutile phase in a molar ratio of tin to antimony of 9:1. The electrode was tested in sulphuric acid electrolyte containing 100 ppm phenol and showed to work since decomposition of phenol could be observed.

EXAMPLE 4

An electrode was prepared in accordance with example 1 except for the diamond particles which were replaced by TiO particles. Continuous electrolysis was performed in a $H_2SO_4$ solution at a current density of 3 A/dm².

EXAMPLE 5

An electrode substrate was prepared as shown in example 1. The binder dispersion was prepared by mixing acidic solution of tetra buthoxi-titanate and penta buthoxi tantalite in a molar ratio of 8 to 2 which then was neutralized with ammonia. The solution turned hazy white and colloidal precipitation was detected. Then, butyl alcohol was added to the hazy liquid containing hydrated titanium-tantalum co-oxide to adjust the total metal content of the liquid to 15 g/l. The obtained liquid had a viscosity of 10 to 20 c-poise. Then, electroconductive titanium oxide was mixed into the dispersion which subsequently was applied with a brush to the electrode substrate. After drying, the substrate was heat treated at 300° C. in air atmosphere resulting in a deposition of 50 g electroconductive titanium oxide/m² substrate area. Then 70 wt % of electroconductive titanium oxide and 30 wt % β-$PbO_2$ particles, whose average particle size was 10 to 12 µm, was applied onto the oxide coated substrate. The substrate was then dried and heat treated. Then, 20 g β-lead dioxide/m² was deposited. The obtained electrode had a surface area of 8 m²/m² electrode substrate, and could be used as anode in continuous electrolysis at a current density of 10 A/dm².

EXAMPLE 6

A tin dioxide particle electrode was prepared by the same process as in example 5, but where β-lead dioxide was replaced by tin dioxide. The tin dioxide was obtained by co-precipitation of 90 mol % of tin tetra-chloride ($SnCl_4$) and antimony-penta-chloride in ethyl alcohol by neutralization with ammonia. About 1 mol % of iridium chloride was then added to the dispersion. Then, the dispersion was dried followed by heat treatment at 400° C. for 30 minutes in air. A black coloured electroconductive tin dioxide was obtained. Then, this tin dioxide was crushed and ground with agate mortar. The obtained tin dioxide powder was co-deposited with electroconductive titanium oxide on the electrode substrate. The surface area of this electrode was 7 to 8 m²/m² electrode substrate. The electrode was then used at a current density of 2 A/m² and showed to work well.

The invention claimed is:

1. A process for manufacturing an electrode comprising depositing on an electrode substrate a binder dispersion comprising a precursor of a conductive or semiconductive oxide, forming a conductive or semiconductive oxide coating from said precursor on the electrode substrate, depositing an electroconductive titanium oxide and electrode particles on the conductive or semiconductive oxide coating, adhering the electroconductive titanium oxide and the electrode particles to the formed conductive or semiconductive oxide.

2. A process according to claim 1, wherein the binder dispersion comprises a precursor of titanium or tantalum oxides.

3. A process according to claim 1, wherein the binder dispersion comprises a precursor of titanium and tantalum oxides.

4. A process according to claim 1, wherein said precursor is thermally decomposed at a temperature from about 300 to about 600° C.

5. A process according to claim 1, wherein the electroconductive titanium oxide substantially is TiO.

6. A process according to claim 1, wherein the electrode particles comprise electroconductive titanium oxide.

7. A process according to claim 1, wherein the electrode particles comprise electroconductive diamond.

8. An electrode obtained by depositing on an electrode substrate a binder dispersion comprising a precursor of a conductive or semiconductive oxide, forming a conductive or semiconductive oxide coating from said precursor on the electrode substrate, depositing an electroconductive titanium oxide and electrode particles on the conductive or semiconductive oxide coating, adhering the electroconductive titanium oxide and the electrode particles to the formed conductive or semiconductive oxide.

9. An electrode comprising an electrode substrate, a conductive or semiconductive oxide coating adhered to said electrode substrate, and electrode particles and electroconductive titanium oxide adhered to said conductive or semiconductive oxide coating.

10. An electrode according to claim 9, wherein the electrode particles comprise electroconductive diamond.

11. An electrode according to claim 9, wherein the electrode particles comprise electroconductive titanium oxide.

12. An electrode according to claim 9, wherein the electroconductive titanium oxide has a weight content from about 5 to about 200 g/m² electrode surface area.

13. An electrode according to claim 9, wherein the electrode particles has a weight content from about 10 to about 500 g/m² electrode surface area.

14. An electrode according to claim 9, wherein the electroconductive titanium oxide has a content of from about 20 to about 70 wt % based on the weight of said oxide coating.

15. An electrode according to claim 9, wherein a first layer of said conductive or semiconductive oxide coating comprises from about 10 to about 70 wt % electrode particles.

16. An electrode according to claim 9, wherein a second layer of said conductive or semiconductive oxide coating comprises from about 30 to about 80 wt % electrode particles.

17. An electrode according to claim 9, wherein the electrode is planar.

18. An electrode according to claim 9, wherein the electrode has a second semiconductive or conductive oxide layer comprising diamond.

* * * * *